United States Patent [19]

Frazier et al.

[11] Patent Number: 4,727,489
[45] Date of Patent: Feb. 23, 1988

[54] APPARATUS FOR ANALYZING THE ANNULUS EFFLUENT OF A WELL

[75] Inventors: Terry L. Frazier, Paso Robles, Calif.; Henry J. Grimm, Allentown, Pa.; John F. Rooney, Houston; Richard S. Allen, Houston; Alfred Brown, Houston; Donald S. Mims, Houston, all of Tex.

[73] Assignee: Texaco Inc., White Plains, N.Y.

[21] Appl. No.: 18,779

[22] Filed: Feb. 27, 1987

Related U.S. Application Data

[63] Continuation of Ser. No. 894,486, Aug. 11, 1986, abandoned, which is a continuation of Ser. No. 552,932, Nov. 17, 1983, abandoned, which is a continuation-in-part of Ser. No. 305,574, Sep. 25, 1981, abandoned.

[51] Int. Cl.⁴ .................... E21B 47/00; G01F 13/00
[52] U.S. Cl. ........................ 364/422; 73/155; 166/250; 166/265
[58] Field of Search ............ 364/422; 73/155, 29; 166/250, 265, 252, 264, 266, 267

[56] References Cited

U.S. PATENT DOCUMENTS

| | | | |
|---|---|---|---|
| 3,371,527 | 3/1968 | Moulin | 73/155 |
| 3,721,121 | 3/1973 | Fierfort | 73/155 |
| 3,909,603 | 9/1975 | Nicolas | 364/422 |
| 3,934,469 | 1/1976 | Howard et al. | 73/155 |
| 3,982,432 | 9/1976 | Hammond | 364/422 X |
| 4,168,624 | 9/1979 | Pichon | 73/195 |
| 4,168,746 | 9/1979 | Sheely | 73/155 |
| 4,223,727 | 9/1980 | Sustek, Jr. et al. | 166/250 |
| 4,267,885 | 5/1981 | Sanderford | 166/250 |
| 4,326,411 | 4/1982 | Gant et al. | 73/155 |
| 4,423,779 | 1/1984 | Livingston | 166/250 |
| 4,429,581 | 2/1984 | Furmaga | 73/155 X |
| 4,436,148 | 3/1984 | Maxwell | 166/250 X |
| 4,458,520 | 7/1984 | Adame et al. | 166/252 |
| 4,488,598 | 12/1984 | Duerksen | 166/252 |
| 4,501,325 | 2/1985 | Frazier et al. | 166/250 |

Primary Examiner—Jerry Smith
Assistant Examiner—Clark A. Jablon
Attorney, Agent, or Firm—Jack H. Park; Kenneth R. Priem; Harold J. Delhommer

[57] ABSTRACT

The disclosed invention is an apparatus for analyzing the annulus effluent of a producing well. The apparatus is designed to measure the flow rate of the annulus effluent, sample the annulus effluent and determine the quantities of each of the various phases of the annulus effluent. The apparatus is preferably mounted on a mobile vehicle and comprises a means for measuring the flow rate of the annulus effluent, a liquid vapor separator to split the annulus effluent into streams of entrained liquid and vapor, a separator to split the entrained liquid into the phases of oil and water, a sampling loop for extracting a sample of annulus effluent vapor which contains a condensor and a separator for splitting the fluid into its various phases, a means for measuring the amounts of all of the phases of the annulus effluent, and a means to record the data gathered. The apparatus is very useful in determining whether a producing well should be shut-in, worked over or left to produce "as is".

28 Claims, 6 Drawing Figures

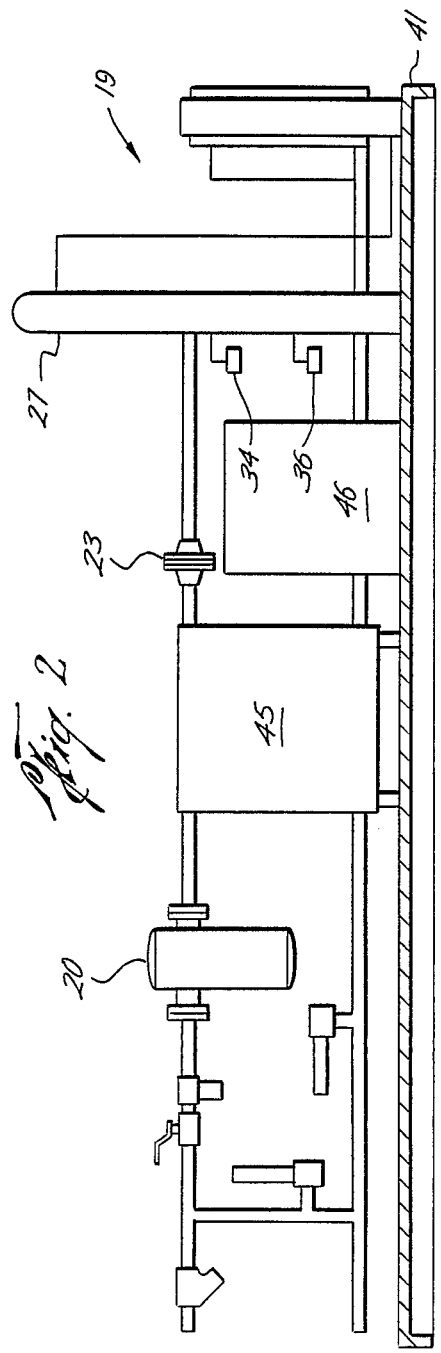
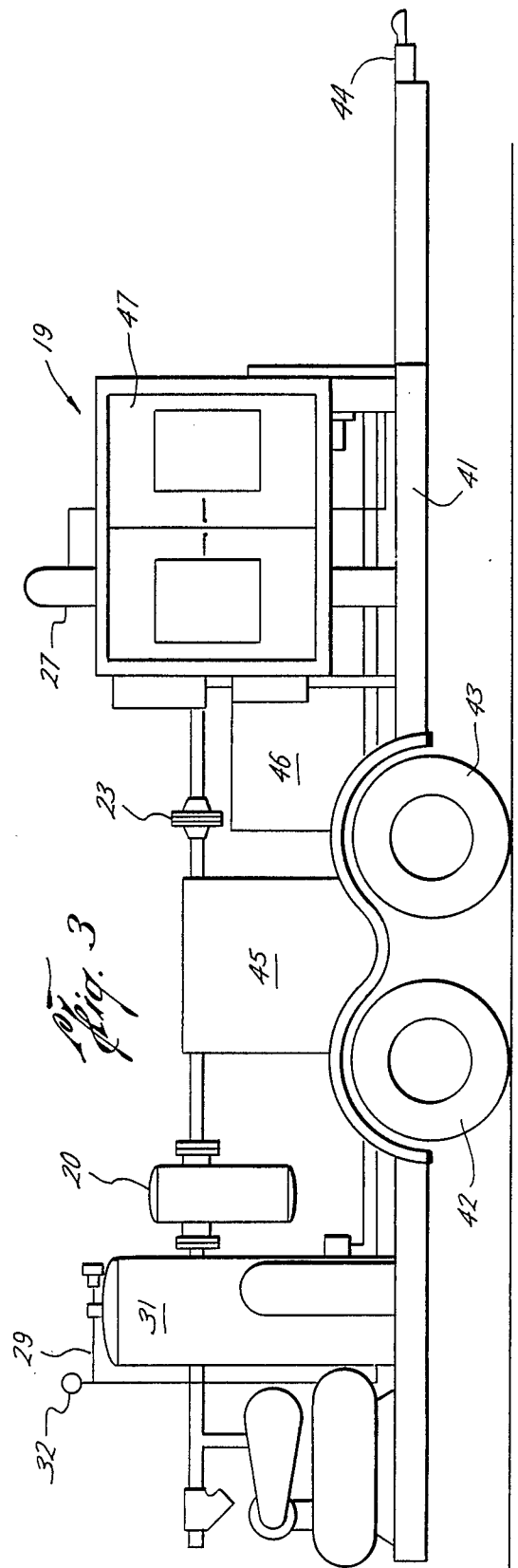

APPARATUS FOR ANALYZING THE ANNULUS EFFLUENT OF A WELL

BACKGROUND OF THE INVENTION

This application is a continuation of U.S. patent application Ser. No. 894,486, filed Aug. 11, 1986 now abandoned, which is a continuation of U.S. patent application Ser. No. 552,932, filed Nov. 17, 1983, now abandoned which is a continuation-in-part of U.S. patent application Ser. No. 305,574, filed Sept. 25, 1981, now abandoned.

This application is also related to U.S. Pat. No. 4,501,325, the specification of which is herein incorporated by reference.

This invention relates to an apparatus for gathering production data from the annulus and tubing production and using that data to determine when to shut in or workover a producing well.

Secondary recovery is the recovery by any method of oil which enters a well as a result of fluid injected after a reservoir has approached its economic production limit by primary recovery methods. Steam flooding has been found to be a successful method of secondary hydrocarbon recovery.

After a steam flood has matured, production may decline for several reasons. A common problem is the creation of a steam override zone through which the steam flood continues to sweep, bypassing much higher oil saturations. This problem can often be partially solved by a workover and recompletion of the production well in a lower portion of the formation. Mechanical problems can also occur with the well which substantially restrict production. These problems can often be solved by workovers. Furthermore, a large percentage of the injected heat (frequently 25% to 50%) may escape the formation through the casing annulus along with light hydrocarbon condensate and non-condensable gases. It may be desirable to shut off a portion of the well's producing zone or even shut-in the entire production from the well for the benefit of the overall steam flood.

Workovers, however, can be very expensive and frequently take a well out of production for a period of time. Thus, it is important and profitable to know whether a particular workover should be performed as well as when to execute the workover.

Economic consideration of a workover must take into account the profit to be made out of oil or gas production. Payout of a specific job depends on the cost of the work, the potential revenues to be obtained, the reserves in the field and the producing rate after the workover. Planning for a workover must take into consideration the original completion, the type of production, and the mechanical problems involved. Detailed information about the well is needed to make these decisions. In steam flood operations, however, accurate production information is difficult to obtain because of variable temperatures, emulsions, flow regimes involved and the high produced heat load.

Oil obtained by workovers is often the lowest cost production that can be obtained by an oil company because the finding cost is zero, and because a sizeable part of the well cost has already been spent before the workover is started. With sufficient information for proper planning, production obtained from old wells after a workover is often the most economical oil obtainable. Accordingly, it is of great importance to know exactly when a producing well should have a workover for increased production.

U.S. Pat. No. 2,916,916 discloses a well apparatus mounted on a trailer for measuring the water/oil ratio of produced fluids. The apparatus consists of a settling tank on wheels having a transparent window for viewing the location of the water/oil interface if and when the respective fractions separate. U.S. Pat. No. 3,371,527 describes a wellbore tool for measuring water cut as well as the density and rate of flow of produced fluids. A method for automatically determining the long-term average of several properties (fluid flow rate, water cut) of producing wells by computer analysis is disclosed in U.S. Pat. No. 3,525,258.

A method and apparatus for determining the water cut and gas/oil ratio of a mixture of fluids produced from a well is disclosed in U.S. Pat. No. 3,530,711. The apparatus is a wellbore tool which is lowered into the well and operates by taking a sample of the produced fluids, allowing the fluids to separate into different phases under the influence of gravity and employing a scanning device to find the level of the interfaces between the phases and transmitting this information to the surface. A different type of apparatus for measuring fluid properties is disclosed in U.S. Pat. No. 3,839,914. The apparatus described is a surface apparatus for determining density, flow velocity and viscosity of mud fluids by differences in pressure.

An apparatus for dividing oil well production into its fluid phases is disclosed in U.S. Pat. No. 3,759,324. The apparatus is designed to separate produced fluids into gas, oil and water and further clean the oil phase so that it may be used to power fluid operated pumps to produce fluids from the well.

SUMMARY OF THE INVENTION

The present invention is an apparatus for analyzing the annulus effluent of a producing well. The apparatus is designed to measure the flow rate of the annulus effluent, sample the annulus effluent and determine the quantities of each of the various phases of the annulus effluent. Preferably, the apparatus is mounted on a mobile vehicle and can be connected to individual wells for receiving the annulus effluent. With a sampling loop, the apparatus measures the flow rate of the annulus effluent, splits the annulus effluent into entrained liquid and vapor, condenses and separates the entrained liquid and vapor into the individual phases of oil, water, light hydrocarbon condensate and noncondensable gas which make up the annulus effluent, determines the quantities of each of the phases of the annulus effluent, records the gathered data and ultimately performs calculations from the gathered data which gives valuable information on the individual well and the enhanced oil recovery flood.

The careful monitoring of producing wells in a steam flood by the apparatus of the present invention permits decisions to be made easily on whether a well should be worked over for greater future production, allowed to continue producing "as is", or shut-in for the benefit of the rest of the steam flood. The invention apparatus works ideally in conjunction with a method employing this information from the monitoring of the annulus effluent to determine the best disposition for the well.

BRIEF DESCRIPTION OF THE DRAWINGS

FIG. 2 is a cutaway view of the invention apparatus along the line 2—2 in FIG. 1.

FIG. 3 is a side plan view of the invention apparatus mounted on a trailer.

DETAILED DESCRIPTION

Figure 1:
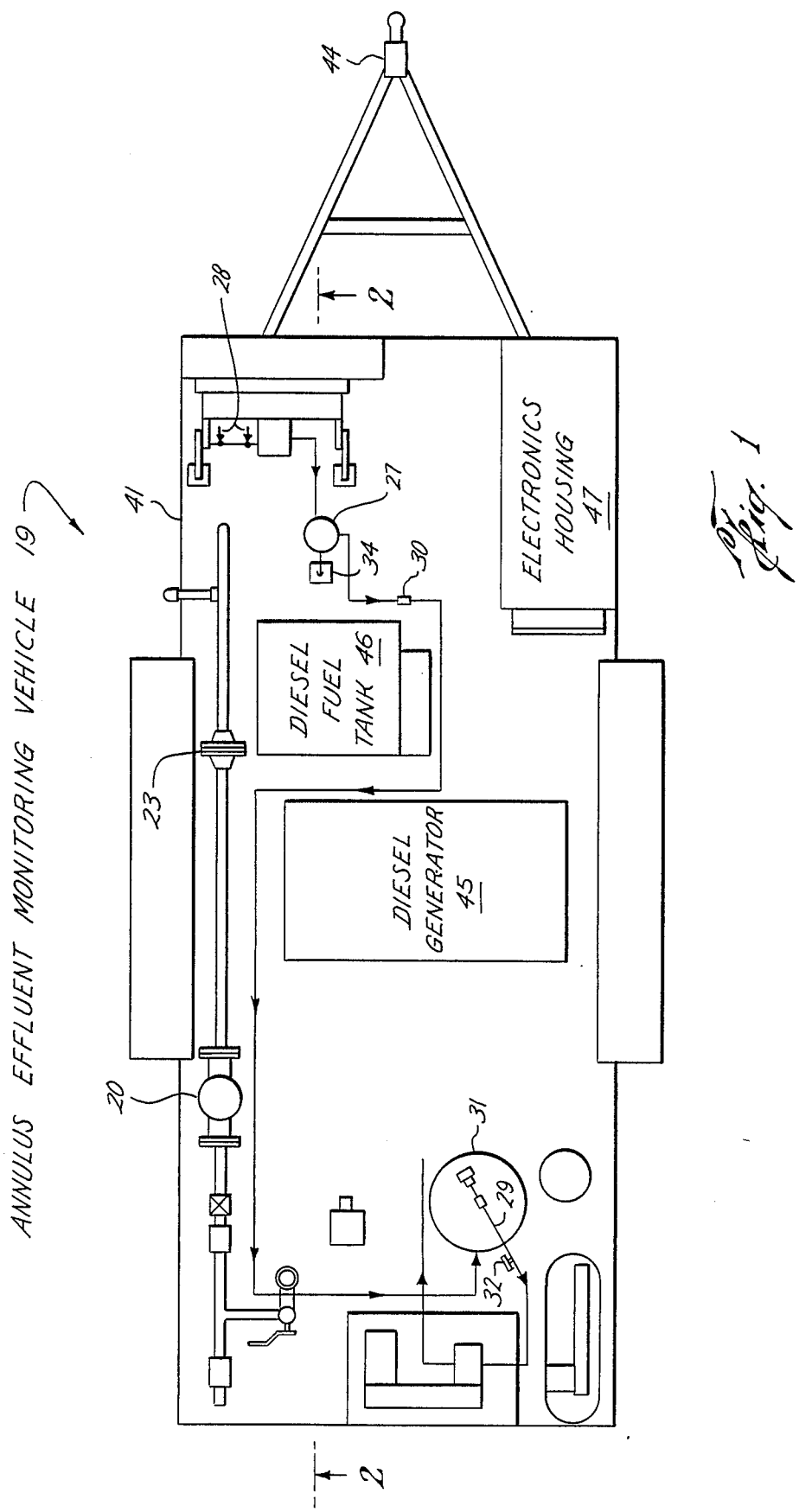
FIG. 1 is a vertical plan view of an embodiment of the apparatus mounted on a trailer.

Although information about the annulus effluent of producing wells is frequently available, such availability is almost always limited to information relating to cumulative annulus effluent production for a large group of wells. The economic nature of large steam flood operations prevents equipment from being installed at each well to gather information on the annulus effluent or on the tubing production. Normally, tubing oil production will not even be known continuously for individual wells. Instead the tubing oil production and annulus effluent production for different components will only be known for large groups of wells.

The invention apparatus has multiple embodiments, the simplest of which condenses and analyzes the annulus effluent without separating entrained liquid from the annulus effluent vapor. This embodiment of the invention contains the following components:

(a) an annulus effluent flow line for receiving the annulus effluent from the well and for discharging the annulus effluent to a flow line designed to carry the annulus effluent away from the well;

(b) a means for measuring the flow rate of the annulus effluent;

(c) a sampling means for obtaining a sample of the annulus effluent from the annulus effluent flow line;

(d) a means for condensing the annulus effluent sample;

(e) a means for separating the condensed sample into its separate phases of oil, light hydrocarbon condensate, water and noncondensable gases; and (f) a means for measuring the quantities of each of the phases.

It is preferred that the apparatus be mounted on a mobile vehicle so that it can be moved from well to well within a field steam flood and that the apparatus also contain a means for recording the output of the various measuring and analytical means of the apparatus.

A favored embodiment of the apparatus will also contain a computing means for calculating various properties of the annulus effluent from the data provided by the above components of the invention, such as the flow rate of the annulus effluent, the amount of water, light hydrocarbon condensate and noncondensable gases contained within the overall annulus effluent and the estimated volume of oil contacted by the steam in the formation in the vicinity of the producing well from the composition of the annulus effluent and from previous correlations drawn between the amount of oil contacted and the composition and volume of the annulus effluent.

For greater accuracy in analysis of the composition of the annulus effluent, the apparatus preferably has a liquid vapor separator to remove entrained liquid from the annulus effluent to be analyzed. The liquid vapor separator splits the annulus effluent into separate entrained liquid and vapor streams which can be independently analyzed. The entrained liquid stream would be separated into its two phases of oil and water and the respective quantities measured, while the vapor stream would be passed to a condensor and then to a separating vessel to yield the three phases of the annulus effluent vapor, the quantities of which are then determined by a measurement means.

Preferably, the light hydrocarbon condensate and noncondensable gas phases of the annulus effluent vapor are returned by means of the sampling loop to the annulus effluent flow line, with or without the separated water phase for incorporation into the annulus gathering system and eventual separation and disposal. The oil and water phases of the entrained liquid are preferably placed in water and oil holding tanks near the individual producing well. But if it is deemed desirable, the separated water and oil phases may be returned to the annulus effluent flow line.

The most preferred embodiment of the apparatus for analyzing the annulus effluent of a producing well is mounted on a mobile platform and contains the components of (a) an annulus effluent flow line for receiving the annulus effluent from the well and for discharging the annulus effluent back to a gathering system pipeline;

(b) a liquid vapor separator contained in the annulus effluent flow line for removing entrained liquid from the flow line;

(c) a means for separating the entrained liquid into oil and water phases;

(d) a means for measuring the quantities of the oil and water phases;

(e) a pressure differential means to measure the flow rate of the annulus effluent vapor in the flow line;

(f) a temperature measuring means to determine the temperature of the annulus effluent;

(g) a sampling means to divert annulus effluent vapor from the flow line into a sampling loop;

(h) a condensor to liquify the annulus effluent vapor;

(i) a separator to split the condensed annulus effluent vapor into its three respective phases;

(j) a means for measuring the quantities for each of the three phases of the vapor sample;

(k) a sampling loop which also contains a return line for carrying the separated phases of the vapor sample back to the annulus effluent flow line after measurement; and (l) a means for recording the output of all the measurement means; and (m) a computation means for calculating from the various data gathered by the apparatus, the flow rate of the annulus effluent vapor, the flow rate of the entrained liquids, the amount of each phase in the annulus effluent, the heat content and heat flow rate of each component of the annulus effluent, and the estimated volume of oil contacted by the steam in the formation near the producing well from the amount of water, condensate and noncondensable gases in the annulus effluent and from previous correlations drawn between the amount of oil contacted and the composition and volume of the annulus effluent.

In FIGS. 1–3 the annulus effluent monitoring apparatus is illustrated as being an integral part of a mobile vehicle, such as but not limited to a trailer 19. The trailer 19 includes the conventional parts of a frame 41, wheels 42 and 43, trailer hitch 44, diesel generator 45, fuel tank 46 and electronics housing 47, which contains the recording means and computation means for operating the apparatus either manually or automatically. It should be noted that the apparatus may also be mounted on a self propelled vehicle rather than a trailer or upon a pallet or frame 41 which is not a part of a trailer as in FIG. 2. In addition, the invention apparatus may also be placed in a fixed location near a particular well.

Figure 4:
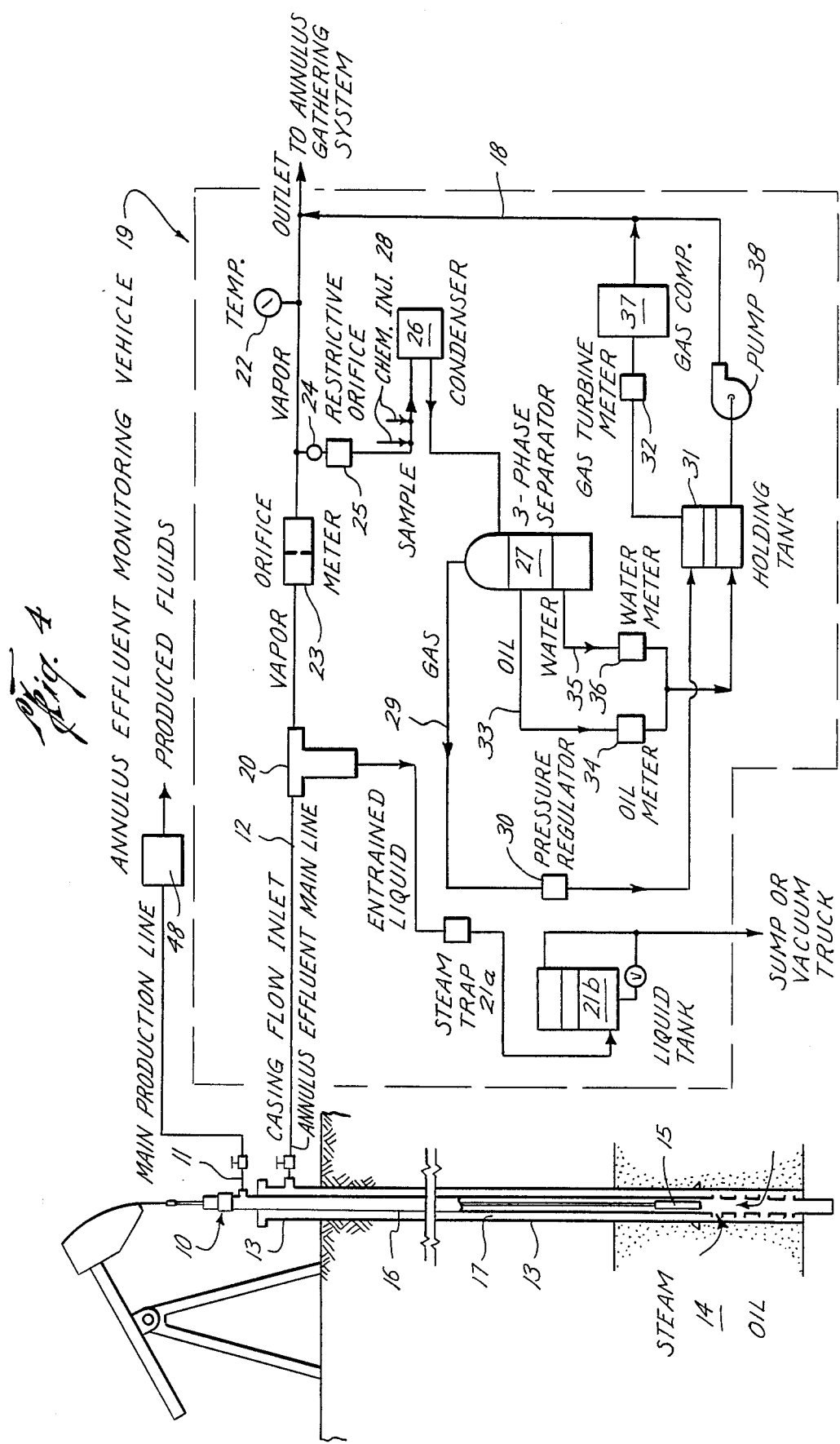
FIG. 4 is a schematic flow chart of an embodiment of the invention apparatus.

FIG. 4 is a flow diagram illustrating the well bore and one embodiment of the apparatus for monitoring annulus effluent. An oil well 10 is illustrated with a main production line 11 for passage of crude oil and an annulus effluent line 12 for delivering the annulus effluent from the well casing 13 to an annulus gathering system (not shown). Crude oil may be pumped from the formation 14 by a conventional oil pump 15 through the production tubing 16 within the perforated casing 13 into the main production line 11. The steam, light hydrocarbon condensate and gases in the formation generally pass through the perforated casing and up the well annulus 17 formed between casing 13 and production tubing 16 into the annulus effluent flow line 12.

The apparatus is preferably designed so that the annulus effluent flow line 12 may be connected to the well to receive annulus effluent from the well and connected to the annulus effluent gathering flow line for carrying annulus effluent away from the well. The sampling loop 18 is connected directly to the annulus effluent flow line 12 as shown in FIG. 4. A liquid-vapor separator 20, such as a cyclone separator, may be mounted on the annulus effluent main line 12 for removing the entrained liquids from the annulus effluent flow line into a separating means, such as an oil and water tank, leaving only vapor in the effluent flow line 12.

After the entrained liquids (oil and water) are separated from the annulus effluent vapors, they pass through an optional steam trap 21a for ensuring that no vapors escape or pass along with the liquids to a means for separating the entrained liquid into oil and water phases. The vessel 21b illustrated in FIG. 4 separates the water from oil by settlement. The means for separating may also include chemical injection ports for injecting emulsion breaking chemicals into the entrained liquid to aid in separation. The quantities of water and oil are determined by a means for measuring and can be recorded in several different ways for integration with the rest of the well information. All piping should be well insulated to reduce heat losses and ensure that gaseous vapors do not condense after passing through the liquid-vapor separator 20.

It is preferred to begin each well test with an initial start-up period of about thirty minutes so that steady state gaseous flow and thermal equilibrium can be established in the apparatus. However, the annulus effluent may also be sampled and analyzed intermittently instead of by a continuous, steady state flow basis.

Downstream from the liquid-vapor separator 20 is a temperature measuring means 22, for indicating the temperature of the annulus effluent and an orifice meter means 23 for measuring the vapor flow rate. Another orifice 25 downstream of meter 23 is preferably employed as a sampling means to maintain a continuous critical restrictive flow of vapors to the vapor portion of the sample loop 18.

The flow rate is measured with orifice meter 23 by preferably measuring the pressure differential. This can be done by either of two methods, a totalizer measured flow rate or a differential pressure measurement. The first method utilizes a totalizer sold by Daniel Industries which measures the differential pressure ($\Delta p$) across an orifice and corrects the $\Delta p$ for the actual static pressure and temperature, based on continuous air flow through the orifice. The true $\Delta p$ is used to calculate the amount of vapors that flowed during the test period. A computer program may be employed to correct the flow rate for the actual vapor composition flowing through the orifice meter.

In the second method the $\Delta p$ and static pressure of the orifice is continuously recorded on a circular type chart. The average $\Delta p$ and static pressure are found by integrating the chart recording. A computer program or manual calculations may be used to obtain the flow rates in standard conditions given the average $\Delta p$, static pressure and temperature.

Although the totalizer method is more accurate, the second method offers the advantages of ease of calibration, maintenance, and trouble-free operation. The second method utilizes a standard oil field $\Delta p$ cell that can be repaired by field personnel. The totalizer and its pressure transducers are proven field devices, but if they malfunction, they must be sent back to the factory for repairs, increasing downtime.

A turbine flow meter may also be employed to measure the rate of flow of the annulus effluent. Such meters are reliable but not as accurate as the above apparatus and methods based on differential pressure.

More accurate flow rate measurements can be obtained if the entrained liquid is removed from the annulus effluent prior to measuring the flow rate. However, this is not necessary. Calculations known to one of ordinary skill in the art can be made to adjust the rate of flow measured by the meter 23 based upon the quantities of entrained liquid measured by the apparatus. But if entrained liquid is not removed, the measuring means 23 can become quickly coated or clogged by entrained liquid, particularly if the liquid is a heavy crude.

A sampling means is necessary to extract a sample of the annulus effluent vapor from the annulus effluent flow line for analysis. The sample may be extracted either continuously or intermittently. In the FIG. 4 embodiment, a sample loop valve 24 directs the vapor flow from the annulus effluent main line 12 to the vapor portion of the loop 18. The vapor then passes through a restrictive orifice 25, which controls the flow rate to a maximum volume or amount, such as about 10–25 liters/hr. liquid equivalent flow rate for a typical small vehicle. This critical orifice 25 which can be changed for varying static pressures provides a vapor sample in a predetermined flow rate range for monitoring non-condensable gases, vaporous light hydrocarbon condensate, and steam condensate.

As shown in FIG. 4, the sampling means may be positioned to draw out a sample after the means for measuring the flow rate. Alternately, the sampling means may also be placed prior to the meter 23 for extracting samples continuously or intermittently as long as the rate of flow given by the means for measuring 23 is adjusted accordingly.

Downstream of the critical orifice 25, the sample effluent flows past emulsion breaking chemical injection ports 28, which may or may not be needed, and through a means for condensing, condenser 26 for cooling the annulus effluent vapor sample to 10°–20° F. above ambient temperature. A suggested condenser 26 is a vertical air-cooled apparatus. This mixture of noncondensable and condensed vapor then enters a three-phase separator 27, a means for separating the condensed annulus effluent vapor sample into three phases of water, light hydrocarbon condensate and noncondensable gas.

After separating the condensed vapor into three phases, the phases are directed to a means for measuring their quantities. In the FIG. 4 embodiment, the three-phase separator 27 dispenses the noncondensable gases out of line 29, through a pressure regulator 30 for maintaining a constant pressure in the line and the separator and through a holding or dump tank 31 to a gas meter 32 for measuring the gas flow. From there, the gas is returned to the annulus effluent main line 12 by gas compressor 37.

The three-phase separator 27 dispenses the oil out of line 33 to oil meter 34 for measuring the amount of oil in the sample before being discharged to the dump tank 31 and back into the annulus effluent flow line 12 by pump 38. Likewise, the three-phase separator 27 dispenses the third major phase of the sample annulus effluent, water, out through line 35 to water meter 36 for measuring the amount of water in the sample before discharge to the dump tank 31 and the annulus effluent flow line 12 by pump 38. Sampling ports may be added to tanks 21b and 31 or separator 27 or flow lines near such tanks to extract samples for later determinations of API gravity. Sensors may also be installed to measure API gravity of such samples based upon previous correlations made between such crude and its response to various light and electromagnetic beams. All meters or sensors preferably transmit their information to a means for recording, such as various paper charts, magnetic recording mediums or other means well known to those skilled in the art.

Preferably, a computation means massages the data from the recording means to translate the data into a more usable form. A computation means may be employed for calculating the flow rate of the annulus effluent vapor, the flow rate of the entrained liquids, the amount of each phase in the annulus effluent and the total heat flow rate as well as the heat flow rate for each phase in the annulus effluent. Further calculations such as the estimated volume of oil contacted in the formation near the producing well may also be performed by a computation means. Calculations may also be performed at a location remote from the apparatus. In the embodiment of FIG. 1-4, the recording means and computation means are located in electronics housing 47.

It is preferred that the apparatus be made explosion proof by use of explosion proof motors, enclosures for certain components and protected electrical conduits. Although such explosion proofing adds substantially to the cost of the annulus effluent monitor, it adds a desirable margin of safety.

The invention apparatus is employed to gather data about a producing well's tubing and annulus production. That information can be employed with a method to determine whether a particular well should be shut-in, left to produce "as is" or revitalized by a workover. The related method is disclosed herein and in related copending U.S. patent application Ser. No. 539,602, filed on Oct. 6 1983, now U.S. Pat. No. 4,501,325, which is incorporated herein by reference.

The method related to the invention apparatus comprises the steps of (1) measuring the flow rate of the annulus effluent, which will also require measuring the temperature and pressure of the annulus effluent;

(2) condensing the annulus effluent;

(3) separating the condensed annulus effluent into the three phases of light hydrocarbon condensate, water (which includes produced steam and liquid water) and noncondensable gases;

(4) measuring the quantities of each of the three phases of the annulus effluent;

(5) calculating a ratio of the quantity of light hydrocarbon condensate to the quantity of water in the annulus effluent;

(6) calculating the minimum economic oil production from the well cost and estimated production revenues;

(7) calculating the estimated volume of oil contacted by the steam in the formation from previous correlations drawn between steam and light hydrocarbon condensate produced as vapor after contacting predetermined volumes of oil having the same characteristics as the oil from the producing well; and finally (8) determining the best disposition of the well using several guidelines based upon the ratio of light hydrocarbon condensate to water produced in the annulus effluent.

It has been surprisingly discovered that the ratio of light hydrocarbon condensate to water produced in the annulus effluent provides a strong indication of the actual tubing production of the well, the potential tubing production of the well, the existence of mechanical difficulties with the well and when a well should be worked over. We have discovered that for California crude in a field at San Ardo having an API gravity of about 12°–13° and taking into account the cost of production and revenue obtainable in 1983, that if the ratio of light hydrocarbon condensate to water is greater than about 0.08, the well should, in most cases, be left to produce "as is". However, even with such a relatively high hydrocarbon condensate to water ratio, it may be advisable to check the well for mechanical production problems by measuring tubing oil production. It is possible for well production to be substantially below minimum economic oil production even though the condensate to water ratio of the annulus effluent is greater than 0.08.

If the ratio is less than about 0.08 and upon measurement, the actual tubing and annulus production is greater than the minimum economic oil production, the well should, of course, be left to produce "as is". If the (a) ratio of condensate to water is less than about 0.08 and (b) the estimated volume of oil contacted by the steam is less than the minimum economic oil production and (c) actual tubing and annulus production is less than the minimum economic oil production, the well's tubing and annulus production should be shut-in. Finally, if (a) the ratio of condensate to water is less than about 0.08 and (b) the estimated volume of oil contacted by steam is greater than the minimum economic oil production and (c) actual tubing and annulus production is less than the minimum economic oil production, a workover should be performed on the well.

The value of the condensate to water ratio of 0.08 mentioned above provides a guideline well suited for the heavy California crude produced from the San Ardo field in central California considering production cost and revenues to be obtained. The ratio guideline should be recalculated for different steam flood conditions and different crude oils. For example, if the cost of steam generation is substantially higher than the steam generation cost incurred in the above-mentioned California field, then a condensate to water ratio of 0.08 or slightly higher may be indicative of the need for a workover or shutting-in of the well. With higher costs, the ratio guideline should be higher. Factors which effect this ratio include the price the condensate is sold compared to the cost of the lost steam and heat; the price received from the tubing oil production; production, drilling and operating costs for the steam flood; and the relationship between condensate annulus production and tubing oil production, which can vary with the gravity and composition of the oil.

The vapor stream is handled as mentioned before, by condensing the vapor stream, separating it into its three phases, measuring the quantities of those phases, and so forth. But, the amount of entrained liquid water must be added to the amount of water phase in the vapor stream to obtain the total water in the annulus effluent for the purpose of calculating the ratio of light hydrocarbon condensate to water.

Part of the method employed with the invention apparatus involves the calculation of the estimated volume of oil contacted by the steam in the formation. This is based upon the amount of light hydrocarbon condensate produced as a vapor with steam in the annulus effluent. It was unexpectedly discovered that the amount of light hydrocarbon condensate produced as a vapor with the steam is dependent upon the volume of oil contacted by the steam in the formation. This relationship, of course, changes with the composition and gravity of the crude contacted. Our studies have shown a close relationship between the amount of oil contacted by the steam in laboratory studies and the volume of oil contacted in the formation.

Figure 5:
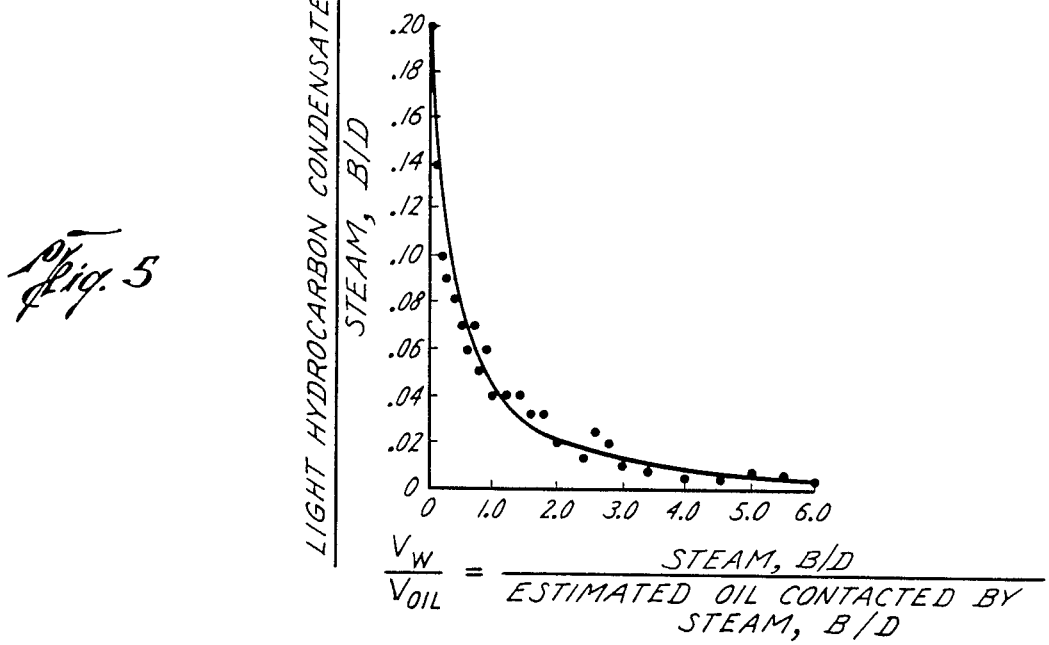
FIG. 5 is a steam distillation curve prepared from laboratory data for a particular crude oil.

Thus, laboratory tests must be performed on formation oil to obtain the correlation between the amount of condensate produced in the annulus effluent along with the volume of steam produced as it relates to the amount of oil contacted in the formation. This correlation is shown in the graph of FIG. 5, a laboratory study on the oil-water ratios of a particular formation crude.

A 91 centimeter cell containing oil in the bottom of the cell was used in laboratory tests. Steam was bubbled through the oil from the bottom. The height of the oil in the cell was calculated to be the minimum height that would not cause liquid entrainment and would produce only vapors off the top of the cell. It is believed that this mechanism roughly approximates the production of light hydrocarbon condensate as a vapor along with steam in the annulus effluent. The steam contacts and strips the condensate from the oil in both the wellbore and the formation. New correlations must be measured and calculated for different crude oils.

The method practiced with the invention apparatus can be further expanded to include several optional steps. Under certain conditions, it may be necessary or helpful to add a demulsifying agent to the vapor stream or the annulus effluent stream to aid in separating the stream into the three phases of the light hydrocarbon condensate, noncondensable gases and water.

Furthermore, considerable information can be gained by measuring the API gravity of the light hydrocarbon condensate as well as the API gravity of the entrained liquid oil. For example, an increase in the API gravity of the hydrocarbon condensate would indicate that the steam was contacting new oil in the formation. A relatively lower API gravity of the condensate would indicate that the steam was primarily contacting a depleted zone in the formation.

These disclosed methods of evaluating the annulus effluent of a producing well and steam flood are useful for many different purposes. By identifying the components of the annulus effluent and the relative quantity of each of those components, and obtaining the steam quality and the mass flow rates of the annulus effluent, wells which should be shut in and wells which should be worked over can be identified. Additionally, by periodically monitoring wells which are potential candidates for shut-in or workover, the most economical time for performing a shut-in or a workover can be predicted by measuring little more than the easily measured ratio of light hydrocarbon condensate to steam produced. The use of a mobile apparatus for carrying out the invention in the field permits such periodic monitoring to be easily accomplished.

After sufficient information has been gathered on the annulus effluent production of a field-wide steam flood or on particular wells, it is rarely necessary to go through the time consuming technique of measuring tubing production for an individual well. The annulus effluent monitoring apparatus (AEM) can be easily connected to a well to record data and perform calculations within a matter of hours, whereas it may take one or more days to obtain accurate information on tubing production. After sufficient information has been gathered, it will be known that a specific ratio of condensate to water will be associated with a specific volume of tubing production. A series of computer programs have been developed to calculate (by methods well known in those skilled in the art) flow rates, composition and heat content of a well's casing effluent based on data obtained with the invention apparatus. The annulus production for a field and the needed size of an annulus gathering system can be easily determined.

Furthermore, this information from a plural number of wells in the field can also be used to approximately determine the vertical and areal conformance of the steam flood through the reservoir. Very good estimates of reservoir conformance can be garnered by injecting nitrogen with steam into one or more wells in each pattern and measuring the amounts of nitrogen which are produced at various wells. The noncondensable gas nitrogen is an excellent tracer gas since it is not normally produced in a steam flood.

The apparatus may also be used to evaluate the heat production in a well. Since the apparatus identifies the components of the annulus effluents and their relative amounts, it is only necessary to multiply the amounts of each component by the heat content of each component at the particular temperature. A summation will then give total heat content of the annulus effluent from each wellhead. The heat content of the tubing production (oil and water) may also be substantially greater than the heat content of the annulus effluent, particularly if the tubing production is relatively high. The tubing production heat content can be easily calculated by determining the heat enthalpy of the oil and water at the production temperature and summing the products of the heat enthalpy of the oil and water and the respective flow rates of each. For a strict accounting of heat, it may be necessary to consider heat transfer from the annulus production to the tubing production and the adjacent formation.

For more accurate figures on minimum economic oil production the minimum economic production should be increased by the cost of producing a sufficient amount of steam to equal the overall heat flow rate for each well. In other words, a standard calculation of minimum economic tubing production for the California wells upon which this method was tested was about 20 barrels of oil per day. Ordinarily, one would assume that tubing oil production of 30 barrels of oil per day would be enough to justify continued production from the well. However, if it requires 15 barrels of oil per day to produce the steam equivalent to the heat lost from the well, the well should clearly be considered an uneconomic well as it would have to produce substantially more oil through the tubing to equal the heat loss. The well should preferably be shut-in so that the formation could retain the steam and heat to increase production from other wells. This assumes that annulus heat production cannot be curtailed without substantially decreasing tubing oil production. Consequently, by the use of the present method, a much truer minimum economic production per well can be obtained by figuring in the lost heat production of the annulus effluent.

Customarily, minimum economic oil production is only measured against tubing oil production. But if an annulus effluent gathering system is employed to collect the annulus effluent for use and sale, annulus production per well should be added to the tubing oil production to determine if the well is producing more than the requisite minimum economic oil production.

The success of a workover on a well can also be easily determined. A successful workover should show substantial reductions in annulus flow rates, steam quality, temperature and heat flow rate. A successful workover should also show an increase in tubing oil production rate, an increase in the light hydrocarbon condensate to water ratio of the annulus effluent and light hydrocarbon condensate having a higher API gravity.

The apparatus permits the easy forecasting of condensate production for a large steam flood and the requirements of an annulus gathering system. The capacity of an annulus gathering system can be estimated by summing the information of the annulus effluent for each well. In addition, after collection of considerable data the vertical and areal conformance of the reservoir to the steam flood can be predicted. Such information is extremely valuable for planning the future of the steam flood including a determination of where and how to drill new wells.

Operation procedures in a steam flood can also be monitored and altered as needed. The vast wealth of information that can be obtained from this apparatus of evaluating the annulus effluent of producing wells can be applied to determine when to change the method of steam injection. The timing of conversions of corner and infill wells from producers to injectors can also be enhanced. Foam and gas treatments can be monitored and evaluated with or without the injection of steam. In fact, a detector can be added to the apparatus to determine the concentration of foaming chemical and gas produced during foam treatments of a formation.

The effectiveness of downhole steam generation can be monitored by returning the steam and associated gases normally entering the formation to the annulus effluent apparatus on the surface. The output of different steam generators can also be monitored by the use of tracers and the apparatus. Evaluation of heat saving methods and appratus such as insulated tubing can be performed.

The following examples will further illustrate the use of the apparatus for analyzing the annulus effluent of a well. These examples are given by way of illustration and not as limitations on the scope of the invention. Thus, it should be clearly understood that the apparatus may be modified to achieve similar results within the scope of the invention.

EXAMPLES 1-8

The apparatus was first employed to analyze seven producing wells in a California steam flood project, obtaining the data of Table I. The wells of Examples 1, 2 and 3 (Wells 348, 125 and 124, respectively) were side wells in the pattern and wells of Examples 4, 5, 6 and 7 (Wells 444, 363, 368 and 441, respectively) were infill wells. See FIG. 6, a plan view of a California steam flood field, for the pattern location of these wells. The apparatus gave the Table I values listed in rows 1,2,3,5,6 and 8. The information in Table I, rows 4,7,9 and 10 was calculated thereafter. Values shown in row 11 were obtained by use of flow meters and tank gauging.

EXAMPLE 1

The ratio of light hydrocarbon condensate to steam for Well 348 was quite low and the total effluent heat produced was high. However, a check of actual tubing oil production indicated that 86 barrels per day were being produced from Well 348. This was production significantly over the minimum economic production for that well. The laboratory developed correlation between steam and estimated oil contacted by steam to give light hydrocarbon condensate indicated that approximately 63 barrels of oil per day were being contacted by the steam to give the measured casing effluent. Both estimated oil contacted by steam and tubing oil production are generally in agreement. This well appeared to be a normal producer and was left to produce "as is".

EXAMPLE 2

The ratio of light hydrocarbon condensate to steam was below 0.08, requiring that the tubing oil production be checked for Well 125. Tubing oil production was very low, a mere 6 barrels of oil per day, significantly below the minimum economic production for Well 125. However, the estimated oil contacted by the steam was approximately 88 barrels of oil per day to give the produced effluents. This suggested that the oil was being moved through the reservoir in the vicinity of the producing well, but was not being captured by the well. These results indicated that a workover should be done to relieve mechanical damage to the well. A workover was performed by placing a non-perforated liner in the top portion of the formation and perforating the bottom one-third of the formation. Regravel packing was done and the end result was a successful workover with production substantially increased and produced heat decreased.

EXAMPLE 3

Well 124 was also a side well with a substantially high ratio of light hydrocarbon condensate to steam of about 0.14. A light hydrocarbon condensate to steam ratio of this magnitude dispenses with the need to go through the time consuming step of physically measuring tubing oil production for that particular well. However, tubing oil production was measured and came out at 174 barrels of oil per day. The estimated oil contacted by the steam was much greater, about 273 barrels of oil per day.

Since the estimated oil contacted by the steam was sixty percent greater than the actual tubing production, the well appeared to be damaged or incapable of capturing the oil moving past it. A serious steam override was indicated by this data. It also seems logical that a workover, deepening the producing interval, should improve production. However, because the well was producing substantially over the minimum economic oil production level, it was decided to periodically monitor the well with the invention apparatus and permit the well production to decrease below the minimum economic oil production prior to performing a workover.

EXAMPLE 4

The low hydrocarbon condensate to steam ratio of 0.0077 was an immediate indication that Well 444 was a poor producing infill well. The extremely high effluent heat output of the well was a strong factor in favor of shutting in the well. Tubing oil production was measured and found to be about 20 barrels of oil per day. Because approximately 31 estimated barrels of oil per day were contacted by the steam, and production was only 20 barrels per day, it was concluded that the well was producing from a partially depleted zone primarily by stripping. It was further discovered that the well was already completed in the bottom Δ of the formation, making it unlikely that a workover would improve production.

The high heat output of the casing effluent, 2088 MBtu/hr, is equivalent to the heat contained in about 8 barrels of oil per day. Thus, the 20 barrels of oil per day of actual tubing production should be reduced by at least about 8 barrels of oil per day, leaving a figure below minimum economic production for that well. Thus it was recommended that the well be converted to an injector well or shut-in.

EXAMPLE 5

The key ratio of light hydrocarbon condensate to steam for Well 363 was a good figure of 0.084. The estimated oil contacted by steam was almost 4 times that of the actual tubing oil production of 47.5 barrels of oil per day. Additionally, the hydrocarbon condensate and noncondensable effluents were the highest of any well monitored. This indicated that the steam was still contacting considerable new oil. The API gravity of the light hydrocarbon condensate was 35.8° API from formation oil that was 12° API, confirming that the steam was contacting new oil. But the low amount of tubing oil production compared to the estimated oil contacted by the steam suggested mechanical problems with this infill well. It was decided to periodically monitor the well and delay the workover until tubing oil production fell further.

EXAMPLE 6

Infill Well 368 had a light hydrocarbon condensate to steam ratio of 0.016, which suggested possible problems. Tubing oil production was measured and then compared with the estimated oil contacted by steam (28 barrels of oil per day estimated to 35 barrels of oil produced per day). This information indicated that the well was producing from a partially depleted zone and probably did not have mechanical problems. It was thought that most of the production was due to gravity drainage and stripping from the partially depleted zone. Periodic monitoring of the well was begun to give an indication of when tubing oil production would drop below the minimum economic production level for that well. A recommendation was made to convert the infill well to an injector or shut-in the well at that time.

EXAMPLE 7

The low light hydrocarbon condensate to steam ratio for Well 441 immediately indicated a problem. Estimated oil contacted by steam was a low 20 barrels of oil per day and tubing production was measured at 0 barrels of oil per day. Fortunately, the well was exhausting a low amount of annulus effluent from the formation.

The measured low heat, high temperature and low annulus effluent production, coupled with 0 tubing oil production indicated that the well probably had mechanical problems and was producing from a depleted zone. It also indicated that a workover would be likely to increase production. However, the amount of production increase to be expected from a workover (as indicated by the estimated oil contacted by steam) was not considered to be sufficient to justify a workover. It was recommended to either shut-in the well or convert the infill well to an injector well.

EXAMPLE 8

The apparatus was also used to monitor an additional steam flood producing well in the same California field as Examples 1-7. A high casing flow of 100 barrels of water per day in the form of steam and a heat loss of about two million Btu/hr were measured. This was deemed a significant heat loss and would only serve to damage the steam cap in that area for future projects.

The tubing oil production was only 23 barrels of oil per day. Eight barrels of oil per day, the equivalent of two million Btu/hr., was subtracted from the tubing production to give a net production of 15 barrels of oil per day. It was recommended to shut-in this uneconomic well.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

TABLE I

SUMMARY OF TEST RESULTS AND ESTIMATED OIL CONTACTED BY STEAM

Figure 6:
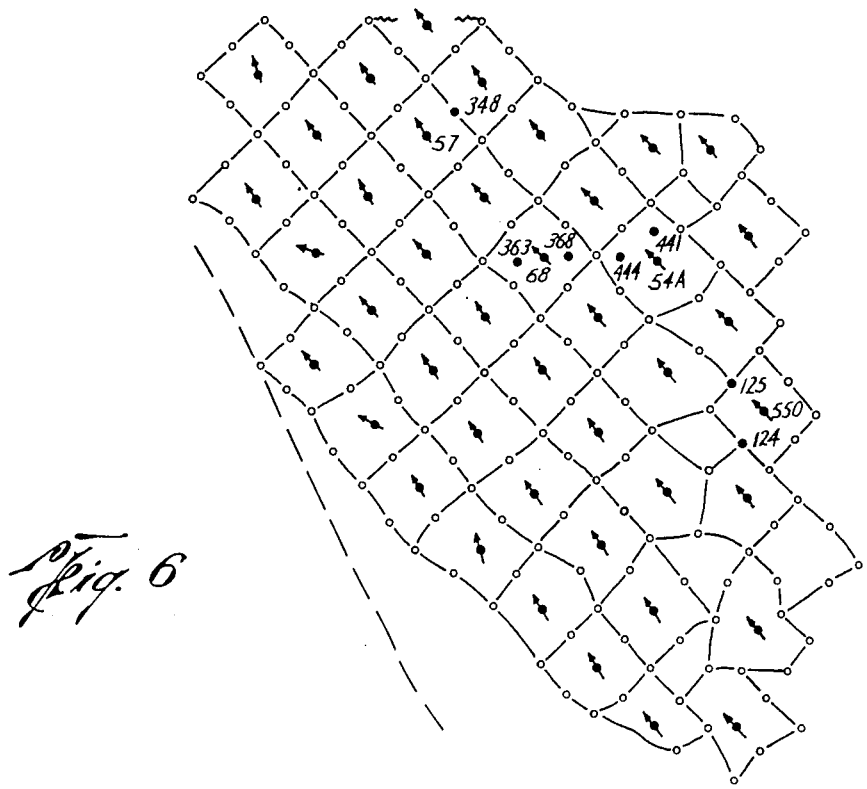
FIG. 6 is plan view of a steam flood field, illustrating a few of the wells discussed in the Examples.

| | | EXAMPLES | | | | | | |
|---|---|---|---|---|---|---|---|---|
| | | 1 | 2 | 3 | 4 | 5 | 6 | 7 |
| | FIG. 6 Well No. | 348 | 125 | 124 | 444 | 363 | 368 | 441 |
| 1. | Noncondensable Gases, MSCF/D | 14.83 | 15.21 | 11.96 | 0.17 | 39.17 | 1.44 | 0.43 |
| 2. | Light Hydrocarbon Condensate, B/D | 3.40 | 3.29 | 5.22 | 0.93 | 5.91 | 1.26 | 1.10 |

TABLE I-continued
SUMMARY OF TEST RESULTS AND ESTIMATED OIL CONTACTED BY STEAM

| | | EXAMPLES | | | | | | |
|---|---|---|---|---|---|---|---|---|
| | | 1 | 2 | 3 | 4 | 5 | 6 | 7 |
| | FIG. 6 Well No. | 348 | 125 | 124 | 444 | 363 | 368 | 441 |
| 3. | Steam (as condensed water), B/D | 89.99 | 49.70 | 37.87 | 120.57 | 70.23 | 79.41 | 32.12 |
| 4. | Light HC Condensate/Steam | 0.0378 | 0.0662 | 0.1378 | 0.0077 | 0.0842 | 0.0159 | 0.0342 |
| 5. | Annulus Temperature, °F. | 294.00 | 306.00 | 308.00 | 310.00 | 280.00 | 284.00 | 305.00 |
| 6. | Steam Quality, % | 98.8 | 98.70 | 97.80 | 99.00 | 99.00 | 98.90 | 97.30 |
| 7. | Total Effluent Heat, MBtu/hr | 1583.48 | 892.95 | 693.80 | 2088.42 | 1279.18 | 1370.80 | 561.91 |
| 8. | Length of Test, hr. | 22.40 | 16.00 | 19.60 | 6.80 | 22.90 | 19.10 | 23.70 |
| 9. | Estimated $V_w/V_{oil}$ | 1.43 | 0.56 | 0.14 | 3.88 | 0.38 | 2.84 | 1.62 |
| 10. | Estimated Oil Contacted by Steam, B/D | 62.9 | 88.34 | 272.79 | 31.10 | 184.82 | 27.97 | 19.87 |
| 11. | Tubing Oil Production, B/D | 86.00 | 6.00 | 174.00 | 20.20 | 47.50 | 35.00 | 0.00 |

What is claimed is:

1. An apparatus for monitoring the annulus effluent of a producing well in a steam flood, which comprises:
    (a) an annulus effluent flow line for receiving annulus effluent from the well and for discharging the annulus effluent to the disposal flow line for the annulus effluent;
    (b) a means for measuring the flow rate of the annulus effluent;
    (c) a sampling means for extracting a sample of the annulus effluent from the annulus effluent flow line;
    (d) a means for condensing the annulus effluent sample;
    (e) a means for separating the condensed annulus effluent sample into three phases of light hydrocarbon condensate, water and noncondensable gases; and
    (f) a means for measuring the quantities of each of the three phases of the condensed annulus effluent sample.

2. The apparatus of claim 1, wherein the means for measuring the flow rate of the annulus effluent comprises a means operating by pressure differential and a temperature measuring means.

3. The apparatus of claim 1, wherein the means for separating is a gravity separation vessel.

4. The apparatus of claim 1, wherein the sampling means, means for condensing, means for separating and means for measuring the quantities of the annulus effluent phases are contained within a sampling loop which extracts an annulus effluent sample from the annulus effluent flow line and returns the separated phases of the annulus effluent sample back to the annulus effluent flow line after measurement.

5. The apparatus of claim 1, wherein the means for separating further comprises an injection port in the sampling loop for the injection of at least one chemical to aid in separating the annulus effluent sample into separate phases.

6. The apparatus of claim 1, wherein the apparatus is mounted on a mobile platform.

7. The apparatus of claim 1, further comprising a means for recording the output of the means for measuring the flow rate of the annulus effluent, the means for measuring the quantities of each separated phase of each annulus effluent sample and the amount of each sample extracted for analysis.

8. The apparatus of claim 1, further comprising a computation means for calculating the flow rate of the annulus effluent and the amount of water, light hydrocarbon condensate and noncondensable gases in the annulus effluent.

9. The apparatus of claim 8, wherein the computation means further calculates the heat flow rate of each phase and the heat flow rate of the total annulus effluent.

10. The apparatus of claim 1, further comprising a liquid vapor separator for removing entrained liquid from the annulus effluent sample.

11. The apparatus of claim 10, further comprising
    (a) a means for separating the entrained liquid into oil and water phases; and
    (b) a means for measuring the quantity of oil and water phases in the entrained liquid.

12. The apparatus of claim 1, further comprising a means for determining the API gravity of the light hydrocarbon condensate phase.

13. The apparatus of claim 1, wherein the sampling means is a restrictive orifice which permits a continuous flow of annulus effluent vapor into the means for condensing the annulus effluent sample.

14. An apparatus for monitoring the annulus effluent of a producing well in a steam flood, which comprises:
    (a) an annulus effluent flow line for receiving annulus effluent from the well and for discharging the annulus effluent to the disposal flow line for the annulus effluent;
    (b) said annulus effluent flow line containing a liquid vapor separator for removing entrained liquid from the annulus effluent, leaving vapor in the annulus effluent, flow line;
    (c) a means for separating the entrained liquid from the liquid vapor separator into oil and water phases;
    (d) a means for measuring the quantities of the oil and water phases from the entrained liquid;
    (e) a means for measuring the flow rate of the annulus effluent vapor in the annulus effluent flow line;
    (f) a sampling means for extracting a sample of the annulus effluent vapor from the annulus effluent flow line;
    (g) a means for condensing the annulus effluent vapor sample;
    (h) a means for separating the condensed annulus efffluent vapor sample into three phases of water, light hydrocarbon condensate and noncondensable gases; and
    (i) a means for measuring the quantities of each of the three phases of the annulus effluent vapor sample.

15. The apparatus of claim 14, wherein the means for measuring the flow rate of the annulus effluent vapor comprises a means operating by pressure differential and a temperature measuring means.

16. The apparatus of claim 14, wherein the means for separating the entrained liquid is a gravity separation vessel.

17. The apparatus of claim 16, wherein the means for separating entrained liquid further comprises an injection port for the injection of at least one chemical to aid in separating the entrained liquid into water and oil phases.

18. The apparatus of claim 14, wherein the means for separating the condensed annulus effluent vapor sample is a gravity separation vessel.

19. The apparatus of claim 18, wherein the means for separating condensed annulus effluent vapor further comprises an injection port for the injection of at least one chemical to aid in separating the condensed vapor into water, oil and light hydrocarbon condensate phases.

20. The apparatus of claim 14, wherein the sampling means, means for condensing, means for separating the condensed annulus effluent vapor and means for measuring the quantities of the annulus effluent vapor phases are contained within a sampling loop which extracts an annulus effluent vapor sample from the annulus effluent flow line and returns the separated phases of the annulus effluent vapor sample back to the flow line after measurement.

21. The apparatus of claim 14, wherein the apparatus is mounted on a mobile platform.

22. The apparatus of claim 14, further comprising a means for recording the output of the means for measuring the quantities of each phase from the entrained liquid, the means for measuring the flow rate of the annulus effluent vapor, the means for measuring the quantities of each phase of each annulus effluent vapor sample and the amount of each sample of annulus effluent vapor extracted for analysis.

23. The apparatus of claim 14, further comprising a computation means for calculating the flow rate of the annulus effluent vapor, the flow rate of the entrained liquids, and the amount of water, light hydrocarbon condensate and noncondensable gases in the annulus effluent.

24. The apparatus of claim 23, wherein the computation means further calculates the heat flow rate of each phase and the heat flow rate of the total annulus effluent.

25. The apparatus of claim 14, further comprising a means for determining the API gravity of the light hydrocarbon condensate phase and the entrained liquid oil phase.

26. The apparatus of claim 14, wherein the sampling means is a restrictive orifice which permits a continuous flow of annulus effluent vapor into the means for condensing the annulus effluent vapor sample.

27. An apparatus mounted on a mobile platform for monitoring the annulus effluent of a producing well in a steam flood, which comprises:
(a) an annulus effluent flow line for receiving annulus effluent from the well and discharging the annulus effluent to the disposal flow line for the annulus effluent;
(b) a pressure differential means for measuring the flow rate of the annulus effluent;
(c) a temperature measuring means for determining the temperature of the annulus effluent;
(d) a sampling means for extracting a sampling of the annulus effluent from the annulus effluent flow line for analysis;
(e) a liquid vapor separator for removing entrained liquid from the annulus effluent sample;
(f) a means for separating the entrained liquid into oil and water phases;
(g) a means for measuring the quantities of oil and water phases from the entrained liquid;
(h) a means for condensing the annulus effluent sample;
(i) a means for separating the condensed annulus effluent sample into three phases of water, light hydrocarbon condensate and noncondensable gases;
(j) a means for measuring the quantities of each of the three phases of the condensed annulus effluent sample;
(k) said sampling means, said liquid vapor separator, said means for separating the entrained liquid, said means for measuring the quantities of each phase from the entrained liquid, said means for condensing, said means for separating the condensed annulus effluent sample and said means for measuring the quantities of each phase from the condensed annulus effluent sample all included within a sampling loop which extracts an annulus effluent sample from the annulus effluent flow line and returns the separated phases of the annulus effluent sample back to the annulus effluent flow line after measurement; and
(1) a means for recording the output of the means for measuring the flow rate of the annulus effluent, the means for measuring the quantites of each separated phase of each annulus effluent sample and the amount of each sample extracted for analysis.

28. An apparatus mounted on a mobile platform for monitoring the annulus effluent of a producing well in a steam flood, which comprises:
(a) an annulus effluent flow line for receiving annulus effluent from the well and for discharging annulus effluent to the disposal flow line for the annulus effluent;
(b) said annulus effluent flow line containing a liquid vapor separator for removing entrained liquid from the annulus effluent, leaving vapor in the annulus effluent flow line;
(c) a gravity separation vessel for separating the entrained liquid from the liquid vapor separator into oil and water phases;
(d) a means for measuring the quantities of the oil and water phases from the entrained liquid;
(e) a pressure differential means for measuring the flow rate of the annulus effluent vapor in the annulus effluent flow line;
(f) a temperature measuring means for determining the temperature of the annulus effluent in the annulus effluent flow line;
(g) a restrictive orifice which permits a continuous sampling flow of annulus effluent vapor from the annulus effluent flow line into a sampling loop;
(h) a means for condensing the annulus effluent from the restrictive orifice;
(i) a gravity separation vessel for separating the condensed annulus effluent vapor into three phases of water, light hydrocarbon condensate and nonecondensable gases;
(j) a means for measuring the quantitites of each of the three phases of the annulus effluent vapor;
(k) said means for condensing the annulus effluent vapor, said gravity separation vessel for separating the condensed annulus effluent vapor, said means for measuring the quantities of the annulus effluent vapor phases, and said restrictive orifice comprising said sampling loop for receiving annulus effluent flow from the annulus effluent flow line and returning the separated phases of the annulus effluent vapor back to the annulus effluent flow line after measurement; and (1) a means for recording the output of the means for measuring the quantitites of each phase of the entrained liquid, the means for measuring the flow rate of the annulus effluent vapor, the means for measuring the quantities of each phase of each annulus effluent vapor sample and the amount of each sample of annulus effluent vapor measured in the sampling loop.

* * * * *